US006113086A

United States Patent [19]

Yonezawa

[11] Patent Number: 6,113,086

[45] Date of Patent: Sep. 5, 2000

[54] ROTARY CLAMPING APPARATUS

[75] Inventor: Keitaro Yonezawa, Kobe, Japan

[73] Assignee: Kabushiki Kaisha Kosmek, Japan

[21] Appl. No.: 08/962,259

[22] Filed: Oct. 31, 1997

[30] Foreign Application Priority Data

Nov. 6, 1996 [JP] Japan ................................ P8-293486

[51] Int. Cl.[7] ........................................ B23Q 3/08

[52] U.S. Cl. ................................ 269/24; 269/32; 269/27

[58] Field of Search ................................ 269/24, 27, 32, 269/31, 93, 136

[56] References Cited

U.S. PATENT DOCUMENTS

| | | | |
|---|---|---|---|
| 3,572,216 | 3/1971 | Seesody | 269/32 |
| 4,265,434 | 5/1981 | Hamilton et al. | 269/27 |
| 4,560,152 | 12/1985 | Miller . | |
| 5,108,079 | 4/1992 | Yonezawa et al. | 269/24 |
| 5,192,058 | 3/1993 | VanDalsem et al. | 269/24 |
| 5,282,888 | 2/1994 | Fukawa et al. | 269/27 |

FOREIGN PATENT DOCUMENTS

| | | |
|---|---|---|
| 49-41550 | 11/1974 | Japan . |
| 57-138550 | 8/1982 | Japan . |
| 1 435 0270 | 5/1976 | United Kingdom . |
| 2 082 093 | 3/1982 | United Kingdom . |

*Primary Examiner*—James G. Smith
*Assistant Examiner*—Lee Wilson
*Attorney, Agent, or Firm*—Bacon & Thomas PLLC

[57] ABSTRACT

An annular piston (4) is inserted into a housing (1) axially movably but unrotatably. A clamp rod (9) is hermetically inserted into a through-hole (4*a*) of the piston (4). When the piston (4) is lowered by a clamping spring (20), a back pressure is produced in pressurized oil within a second chamber (12) formed below the piston (4). The back pressure pushes an input portion (9*a*) for clamping provided at a lower end of the clamp rod (9) to a stopper (23) through a bearing (24) and a transmission plate (25). The piston (4) is lowered relatively to the clamp rod (9) at a raised position, whereby the clamp rod (9) is rotated by a converting mechanism (21).

6 Claims, 7 Drawing Sheets

ROTARY CLAMPING APPARATUS

BACKGROUND OF THE INVENTION

1. Technical Field

The present invention relates to a clamping apparatus of the type that moves a clamp rod linearly to a clamping position after having rotated it from a retreated position to an unclamping position, and more particularly to a technique making it possible for a clamping spring to perform a strong clamping.

2. Explanation of Earlier Technology

Generally, a rotary clamping apparatus of this type is adapted to drive a clamp rod to a clamping position by pressurized oil supplied to an actuation chamber for clamping (for example, see Japanese Patent Publication No. 49-41550).

Although the foregoing prior art is excellent in that it can effect a strong clamping by the pressure of a fluid such as pressurized oil, it has a problem that when the fluid pressure within the actuation chamber for clamping disappears due to fluid leakage or the like, clamping force also disappears.

SUMMARY OF THE INVENTION

In order to solve the above-mentioned problem, the present invention has an object to provide a rotary clamping apparatus of such a type as being capable of driving a clamp rod by a spring force and to make the clamping apparatus compact.

The present invention has constructed the rotary clamping apparatus in the following manner, for example, as shown in FIGS. 1 to 7 or FIG. 10 so as to accomplish the foregoing object.

An annular piston 4 is axially movably but unrotatably inserted into a housing 1. A first chamber 11 is formed between a first end wall 1*a* of the housing 1 and the piston 4. And a second chamber 12 is formed between a second end wall 1*b* of the housing 1 and the piston 4. A clamp rod 9 is hermetically inserted into a through-hole 4*a* of the piston 4. An input portion 9*a* for clamping provided at a second end portion of the clamp rod 9 is projected into the second chamber 12. While a clamping spring 20 mounted in the first chamber 11 urges the piston 4 toward the second end wall 1*b,* the piston 4 is adjusted to be movable toward the first end wall 1*a* against the clamping spring 20 by a pressurized fluid supplied to the second chamber 12. Provided between an input portion 9*c* for rotation of the clamp rod 9 and the piston 4 is a converting mechanism 21 for converting an axial movement of the piston 4 to a rotary movement of the clamp rod 9. There is provided a stopper 23 for preventing the input portion 9*a* for clamping from moving toward the first end wall 1*a*. When the clamp rod 9 is rotated for clamping, a pushing means (P) pushes the input portion 9*a* for clamping to the stopper 23.

The present invention functions in the following manner, for example, as shown in FIGS. 2(A), 2(B) and 2(C).

In a retreated condition of FIG. 2(A), the pressurized fluid supplied to the second chamber 12 raises the piston 4 and the clamp rod 9 to push the input portion 9*a* for clamping of the clamp rod 9 to the stopper 23.

In the retreated condition, as the pressurized fluid is discharged from the second chamber 12, an urging force of the clamping spring 20 pushes the piston 4 downward and on the other hand the pushing means (P) (here the pressurized fluid produced in the second chamber 12 creating a back pressure by the urging force of the clamping spring 20) maintains the clamp rod 9 at an initial raised position. Therefore, as shown in FIG. 2(B), the converting mechanism 21 rotates the clamp rod 9 relatively to the piston 4 to switch it over to an unclamping position (Y) and then lowers the clamp rod 9 straightly along with the piston 4 to switch it over to a clamping position (X) as shown in FIG. 2 (C).

On switching over a clamping condition of FIG. 2(C) to the retreated condition of FIG. 2(A), the pressurized fluid is supplied to the second chamber 12. Then the clamp rod 9 is driven by the procedures contrary to the foregoing ones.

This invention presents the following advantages.

As mentioned above, since a clamping spring can urge a clamp rod toward a clamping position, it has become possible to strongly clamp a metal mold, a workpiece or the like object to be fixed, by an urging force of the spring.

Further, the clamp rod is inserted into a through-hole of an annular piston and an input portion for clamping provided at an end portion of the clamp rod is projected into a second chamber so that it can be received by a stopper. Accordingly, an axial midway portion of the clamp rod need not be stepped. This can make the clamp rod highly rigid as well as small and light.

In addition, the urging force of the clamping spring is made to act on the clamp rod through the piston and the clamp rod is adjusted to be rotatable relatively to the piston, so that it is possible to prevent the spring from twisting when the clamp rod is rotated and further simplify the construction for preventing its twist.

Moreover, a converting mechanism being arranged between the clamp rod and the piston, a space dedicated for the converting mechanism can be omitted. Consequently, a height of a housing can be reduced to decrease an axial space for installing a rotary clamping apparatus.

BRIEF DESCRIPTION OF THE DRAWINGS

FIGS. 1 to 7 show a first embodiment of the present invention;

FIG. 1 is a vertical sectional view of a clamping apparatus in a retreated condition;

FIG. 3 is a schematic view in elevation of an input portion for rotation provided in a clamp rod of the clamping apparatus;

FIG. 5 is a developed view of the piston when it is cut along a line V in FIG. 4(A) and the cut surface is seen from its inside;

FIG. 6 is a developed view of the input portion for rotation and corresponds to FIG. 5;

DESCRIPTION OF THE PREFERRED EMBODIMENTS

A first embodiment of a clamping apparatus according to the present invention is explained with reference to FIGS. 1 to 7.

Figure 1:
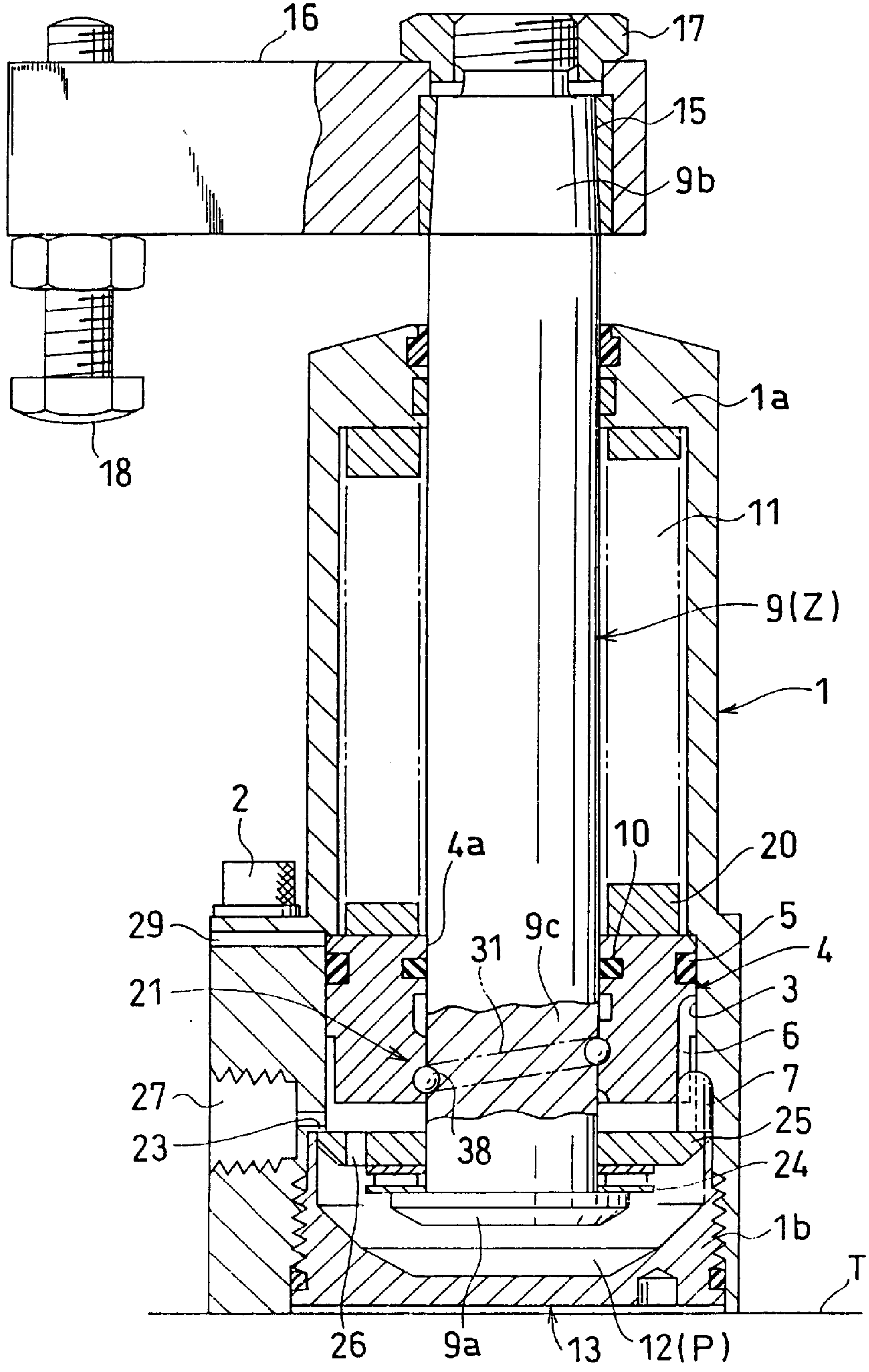

First, a construction of the clamping apparatus is explained by the vertical sectional view of FIG. 1.

A housing 1 of the clamping apparatus is fixed to an upper surface of a table (T) by a plurality of bolts 2 (only one of which is shown in this embodiment).

An annular piston 4 is inserted into a guide bore 3 of the housing 1 oiltightly and vertically movably through a first packing 5. The piston 4 is prevented from rotating around an axis by engaging a vertical groove 6 of the piston 4 with a detent pin 7.

A first chamber 11 is formed between a upper end wall (a first end wall) 1*a* of the housing 1 and the piston 4. And a second chamber 12 is formed between a lower end wall (a second end wall) 1*b* of the housing 1 and the piston 4. The lower end wall 1*b* is constructed from a bottom wall of a screw cap 13. The screw cap 13 positions the detent pin 7.

A clamp rod 9 is inserted into a through-hole 4*a* of the piston 4 oiltightly through a second packing 10. An input portion 9*a* for clamping provided at a lower end portion (a second end portion) of the clamp rod 9 is projected into the second chamber 12. An output portion 9*b* for clamping provided at an upper end portion (a first end portion) of the clamp rod 9 is projected upward of the upper end wall 1*a* of the housing 1. An arm 16 is fixed onto a tapered surface 15 of the output portion 9*b* through a nut 17. A push bolt 18 is brought into screw-thread engagement with a leading end of the arm 16 so as to be vertically adjustable.

While the piston 4 is urged downward by a clamping spring 20 consisting of a compression coil spring and mounted in the first chamber 11, it is moved upward against the clamping spring 20 by pressurized oil supplied to the second chamber 12. There is provided a converting mechanism 21 for converting a vertical movement of the piston 4 to a rotary movement of the clamp rod 9. A concrete structure of the converting mechanism 21 is described later.

Provided on a peripheral wall of the second chamber 12 is a stopper 23 for preventing the input portion 9*a* for clamping from moving upward. A thrust bearing 24 and an annular transmission plate 25 are interposed between the input portion 9*a* and the stopper 23. The transmission plate 25 is externally fitted onto the input portion 9*a* and supported axially movably by the peripheral wall of the second chamber 12. An upper side of the transmission plate 25 is communicated with a lower side thereof through a communication hole 26. Numeral 27 indicates a supply and discharge port of the pressurized oil.

A breather passage 29 provided between the first chamber 11 and an outside of the housing 1 may be omitted. However, if the breather passage 29 is provided, it is preferable to attach to the breather passage 29 a check valve (not shown) for prohibiting a flow from the outside of the housing 1 to the first chamber 11. The check valve can prohibit moisture, dust or the like foreign matters existing in the atmosphere from invading the first chamber 11 and therefore the piston 4 can be smoothly driven for a long period of time.

Figures 2A, 2B, 2C:
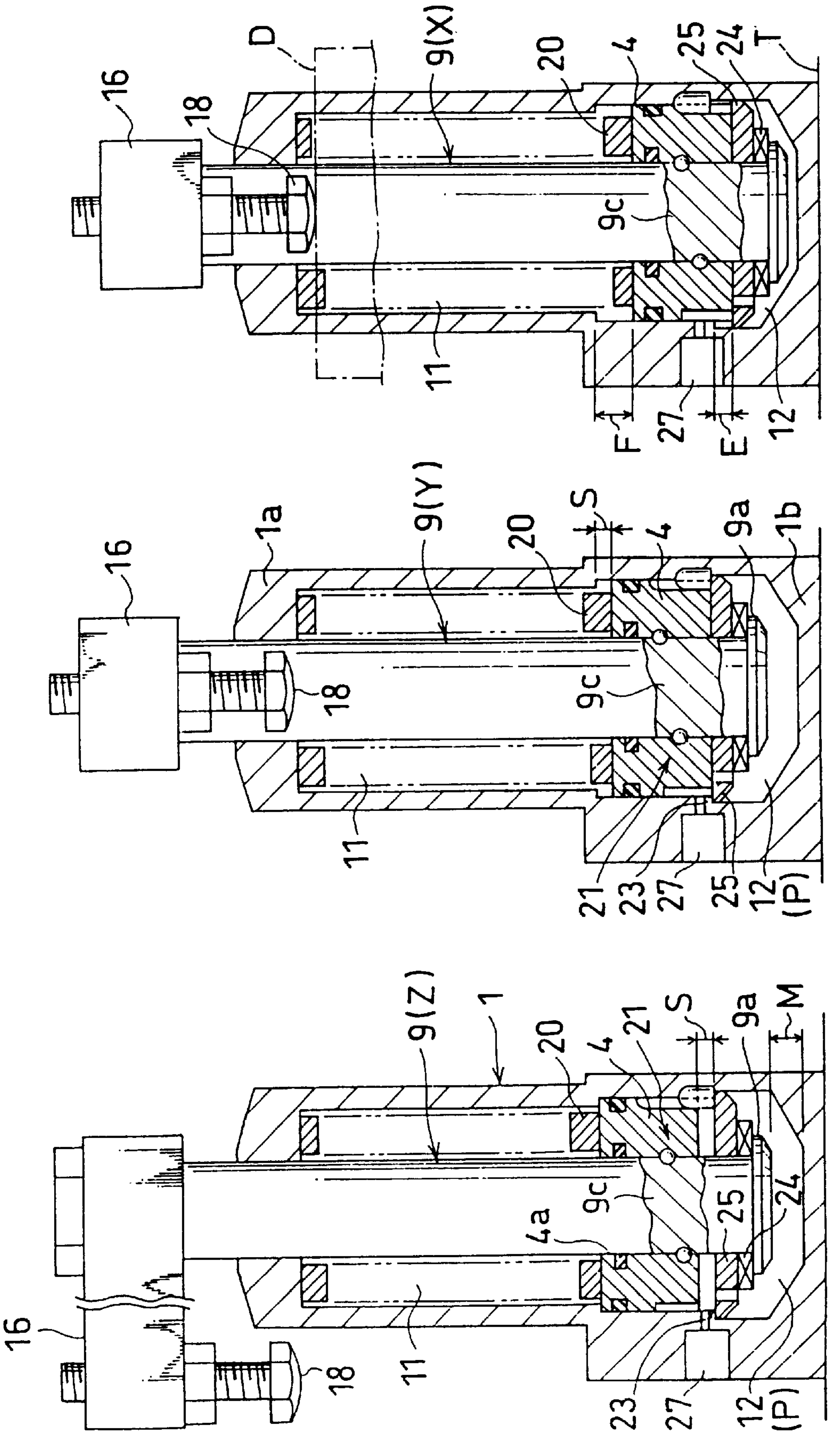
FIG. 2(A) is a schematic view for explaining the operation of the clamping apparatus and shows the retreated condition.
FIG. 2(B) shows an unclamping condition.
FIG. 2(C) shows a clamping condition.

Operation of the clamping apparatus is explained hereafter by resorting to FIGS. 2(A), 2(B) and 2(C).

In a retreated condition shown in FIG. 2(A), pressurized oil (having a pressure of about 50 to 140 kgf/cm$^2$ about 5 to 14 MPa' in this embodiment) is supplied to the second chamber 12. The piston 4 and the clamp rod 9 are raised. Further, an allowable stroke (M) is formed below the input portion 9*a* for clamping.

On switching over the clamping apparatus from the retreated condition of FIG. 2(A) to a clamping condition of FIG. 2(C) via an unclamping condition of FIG. 2(B), the pressurized oil within the second chamber 12 is gradually through the supply and discharge port 27 allowing the piston 4 to go down by an urging force of the clamping spring 20. The pressurized fluid a predetermined back pressure (a pressure of about 10 to 50 kgf/cm$^2$ 'about 1 to 5 MPa' in this embodiment) within the second chamber 12.

The back pressure of the pressurized fluid keeps the input portion 9*a* for clamping pushed to the stopper 23 through the thrust bearing 24 and the transmission plate 25. Therefore, the clamp rod 9 is rotated by the converting mechanism 21 while the piston 4 is going down. In other words, the pressurized fluid creates a back pressure within the second chamber 12 so as to constitute a pushing means (P) at the time of clamp rotation.

The pushing means (P) may further include a weak pushing spring which supplies a force in addition to the back pressure within the second chamber 12 or may consist of only a pushing spring.

And as shown in FIG. 2(B), when the piston 4 goes down by a rotation stroke (S) and its lower surface contacts with the transmission plate 25, the clamp rod 9 is switched over to an unclamping position (Y). Next, the piston 4 lowers the input portion 9*a* for clamping by the urging force of the clamping spring 20 to switch over the clamp rod 9 to a clamping position (X) of FIG. 2(C). Thus the push bolt 18 fixes a metal mold (D) to the table (T). In FIG. 2(C) character (E) indicates a clamping stroke and character (F) does a stroke of the clamping spring 20.

On switching over the clamping condition of FIG. 2(C) to the retreated condition of FIG. 2(A) via the unclamping condition of FIG. 2(B), the pressurized oil is supplied from the supply and discharge port 27 in the clamping condition of FIG. 2(C).

Then the oil pressure acts on the clamp rod 9 and the piston 4. The oil pressure acting on a receiving area of the clamp rod 9 pushes up the piston 4 through the input portion 9*a* for clamping, the thrust bearing 24 and the transmission plate 25 in order and the oil pressure acting on an annular receiving area of the piston 4 also pushes up the piston 4.

Thus the piston 4 is raised against the clamping spring 20 and as shown in FIG. 2(B) the input portion 9*a* for clamping is prevented from going up by the stopper 23 to switch over the clamp rod 9 to the unclamping position (Y).

Subsequently, only the piston 4 is raised relatively to the clamp rod 9 prevented from going up, whereby the clamp rod 9 is rotated by the converting mechanism 21 to a retreated position (Z) of FIG. 2(A).

Figure 3:
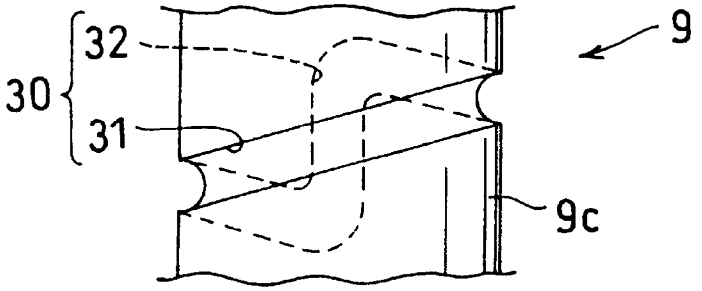
Figure 4A:
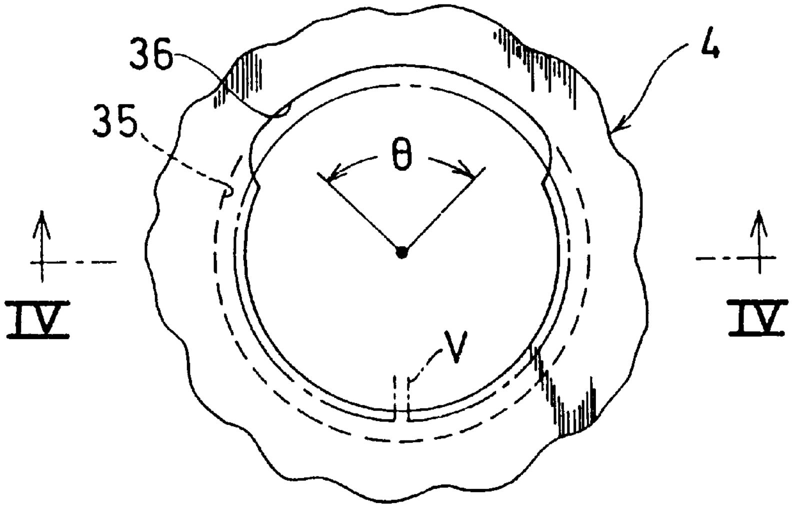
FIG. 4(A) is a schematic plan view of an annular piston to be engaged with the input portion for rotation.
Figure 4B:
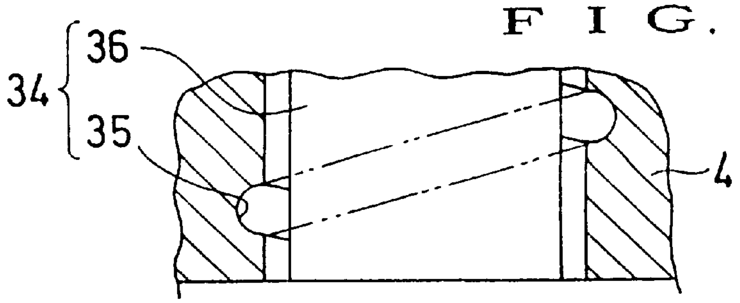
FIG. 4(B) is a sectional view taken along a line IV—IV in FIG. 4(A) when seen in a direction indicated by arrows.
Figure 5:
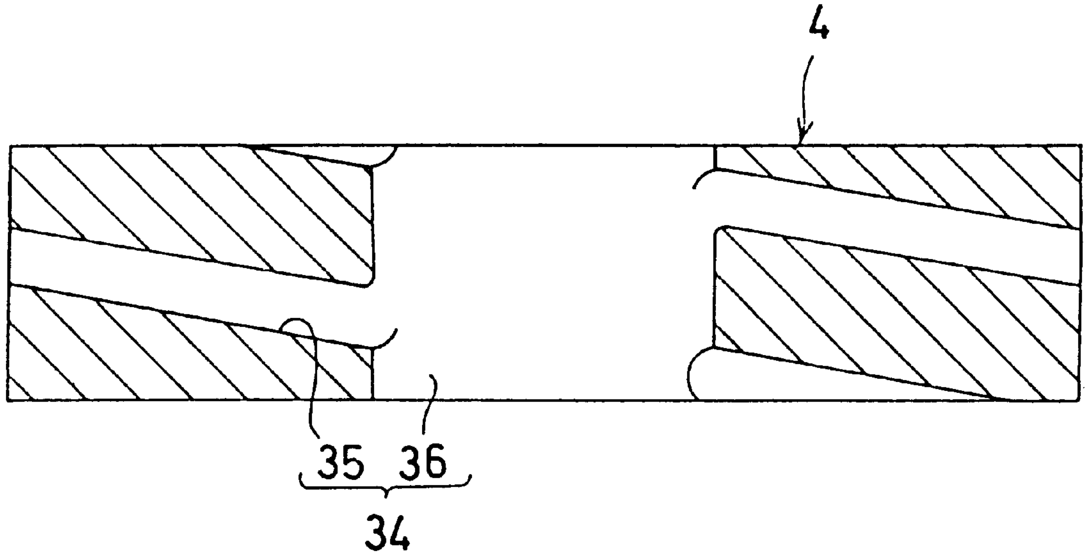
Figure 6:
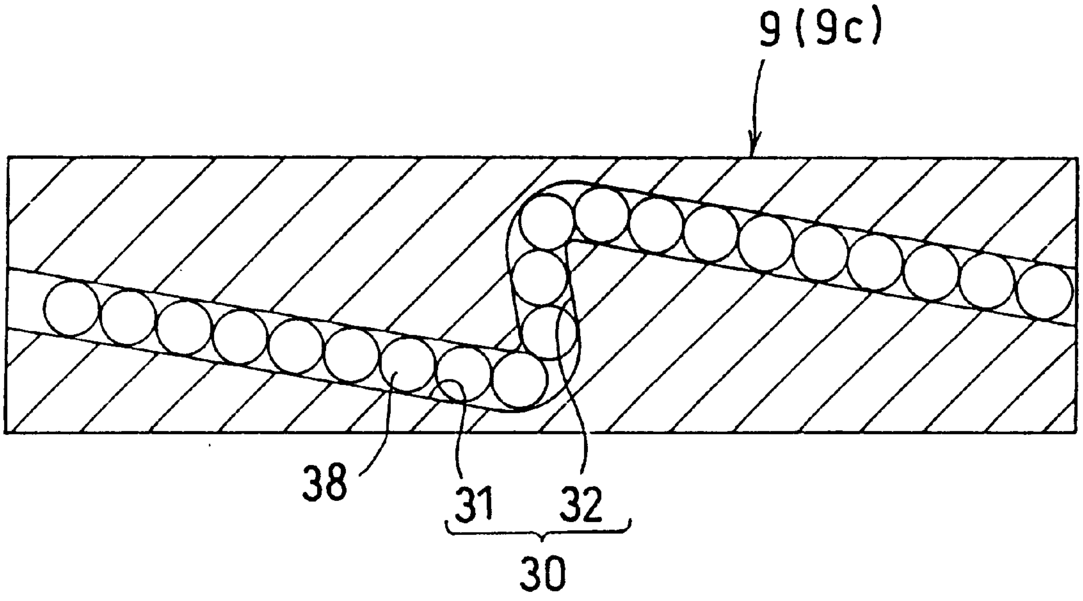

A concrete structure of the converting mechanism 21 is explained with reference to the schematic views of FIGS. 3 to 7. FIG. 3 is an elevation view of an input portion 9*c* for rotation of the clamp rod 9. FIG. 4(A) is a partial plan view of the piston 4. FIG. 4(B) is a sectional view taken along a line IV—IV in FIG. 4(A) when seen in a direction indicated by arrows. FIG. 5 is a developed view of the piston 4 when the piston 4 is cut along a line V in FIG. 4(A) and the cut surface is seen from its inside. FIG. 6 is a developed view of the input portion 9*c* and corresponds to FIG. 5.

As shown in FIGS. 3 and 6, the input portion 9*c* for rotation is provided with a rotary groove 30 concaved in the shape of an arc. The rotary groove 30 is composed of a first groove portion 31 formed spirally by about one pitch in an outer peripheral surface of the input portion 9*c* and a second groove portion 32 communicating an initial end of the first groove portion 31 with a terminal end thereof substantially in an axial direction.

As shown in FIGS. 4 and 5, the piston 4 is provided with an actuating groove 34. The actuating groove 34 is composed of a rotation actuating groove portion 35 formed spirally in correspondence with the first groove portion 31 and a relief groove portion 36 formed so as to extend peripherally in correspondence with the second groove portion 32. The peripheral length of the relief groove portion 36 is adjusted to correspond to a desired rotation angle (θ) (about 90 degrees in this embodiment) of the clamp rod 9 as shown in FIG. 4(A).

As shown in FIG. 6 (and FIG. 1), a number of steel rolling balls 38 are charged into a space between the rotary groove 30 and the actuating groove 34.

Figure 7A:
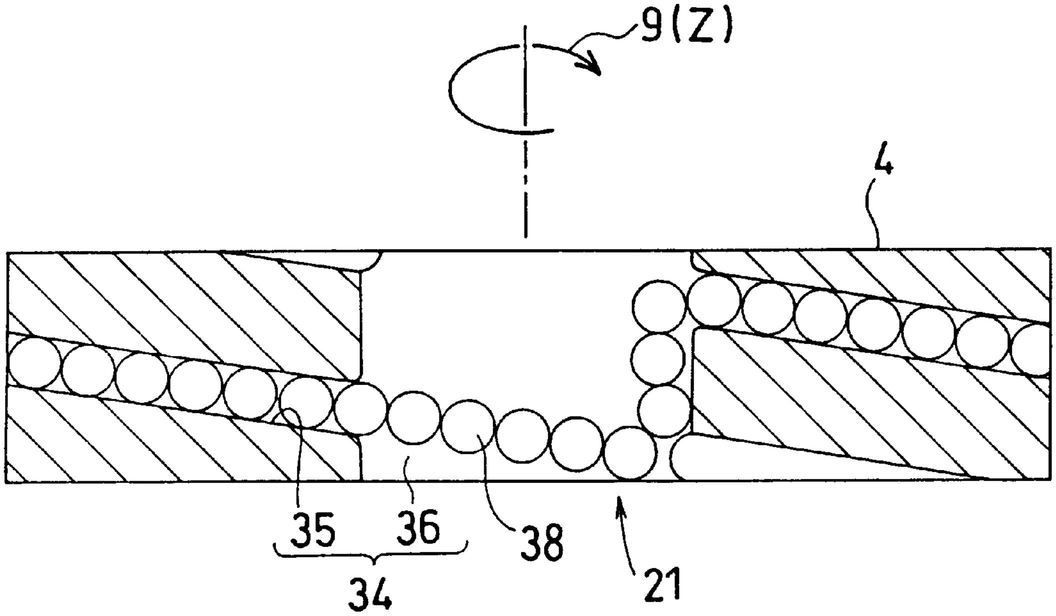
FIG. 7(A) is a schematic view for explaining the operation of a converting mechanism of the clamping apparatus and shows the retreated condition.
Figure 7B:
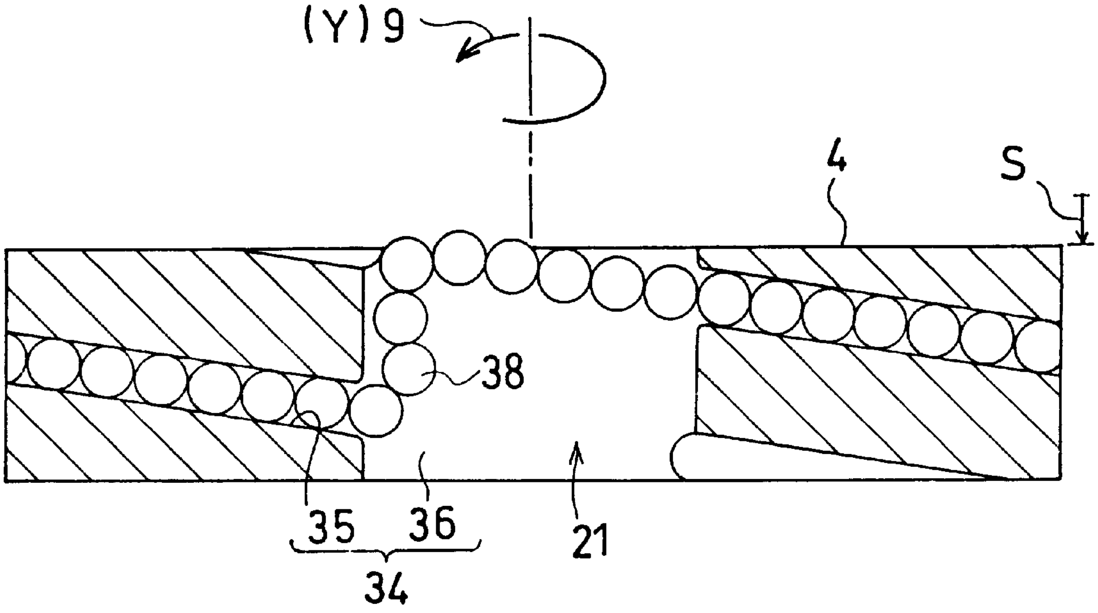
FIG. 7(B) shows the unclamping condition.

Operation of the converting mechanism 21 of the foregoing structure is explained by resorting to the schematic views of FIGS. 7(A) and 7(B) for explaining the operation with reference to FIGS. 2(A) and 2(B) and FIG. 6.

In the retreated condition shown in FIG. 2(A) and FIG. 7(A), the piston 4 is raised relatively to the clamp rod 9 and the clamp rod 9 is rotated in a clockwise direction when seen in plan and switched over to the retreated position (Z). When the clamp rod 9 is rotated for clamping, the piston 4 is lowered by a rotation stroke (S) relatively to the clamp rod 9 at the retreated position (Z) of FIG. 2(A). Then as shown in FIG. 2(B) and FIG. 7(B), the clamp rod 9 is rotated in a counterclockwise direction when seen in plan along the rotation actuating groove portion 35 and at the same time the many balls 38 are circulated in the counterclockwise direction when seen in plan. Thus the clamp rod 9 is switched over to the unclamping position (Y).

When rotating for retreating, the clamp rod 9 is switched over from the unclamping position (Y) of FIG. 2(B) and FIG. 7(B) to the retreated position (Z) of FIG. 2(A) and FIG. 7(A) according to the procedures substantially contrary to the above-mentioned ones.

Since the converting mechanism 21 does not exert any excessive force on the balls 38, it is sufficient to provide only a single set of the rotary groove 30 and the actuating groove 34 and charge merely a small number of required balls, which results in the possibility of making the converting mechanism 21 compact and simple. Further, having a structure of rolling-ball type, the converting mechanism 21 suffers from only a small frictional resistance at the time of rotation. In consequence, it is possible to perform a smooth rotation and at the same time shorten a lead of the rotary groove 30. As a result, the rotation stroke (S) can be reduced, which in turn decreases a vertical space for installing the clamping apparatus.

The first embodiment further presents the following advantages.

When the clamp rod 9 rotates for clamping, the urging force of the clamping spring 20 produces the predetermined back pressure in the pressurized fluid within the second chamber 12. The input portion 9*a* for clamping can be pushed to the stopper 23 by utilizing that back pressure acting on the clamp rod 9. Therefore, the pushing spring may be removed from the pushing means (P). Alternatively, in a case where a spring force of the pushing spring constitutes a portion of a pushing force of the pushing means (P), it becomes possible to set an urging force of the pushing spring to a small value owing to the existence of the back pressure.

Accordingly, the pushing means (P) becomes compact to result in the possibility of making the clamping apparatus smaller.

Additionally, interposed between the input portion 9*a* for clamping and the stopper 23 is the annular transmission plate 25, into which the input portion 9*a* is inserted rotatably. Consequently, an outer diameter length of the input portion 9*a* can be decreased to result in the possibility of making the clamp rod 9 lighter.

Besides, the annular transmission plate 25 is supported on the peripheral wall of the second chamber 12 axially movably, so that the input portion 9*a* for clamping can be guided by the peripheral wall of the second chamber 12 through the transmission plate 25. Thus the clamp rod 9 can be guided with an improved accuracy to result in the possibility of conducting the clamping operation assuredly.

Moreover, the thrust bearing 24 is interposed between the annular transmission plate 25 and the input portion 9*a* for clamping. This arrangement can rotate the clamp rod 9 smoothly and assuredly to result in the possibility of making the converting mechanism 21 simple and compact.

Figure 8:
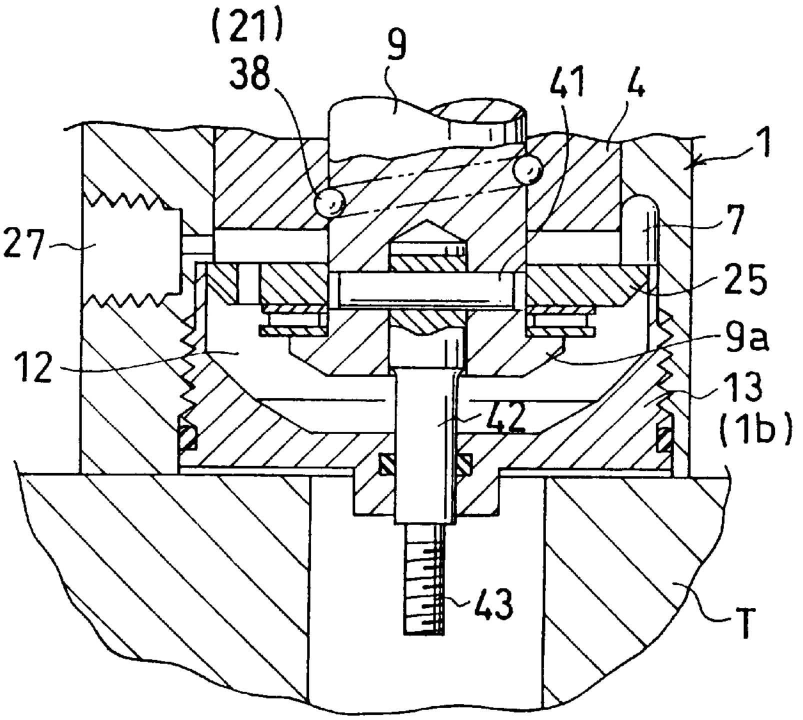
FIG. 8 shows a modification of the clamping apparatus and is a partial view corresponding to FIG. 1.
Figure 9:
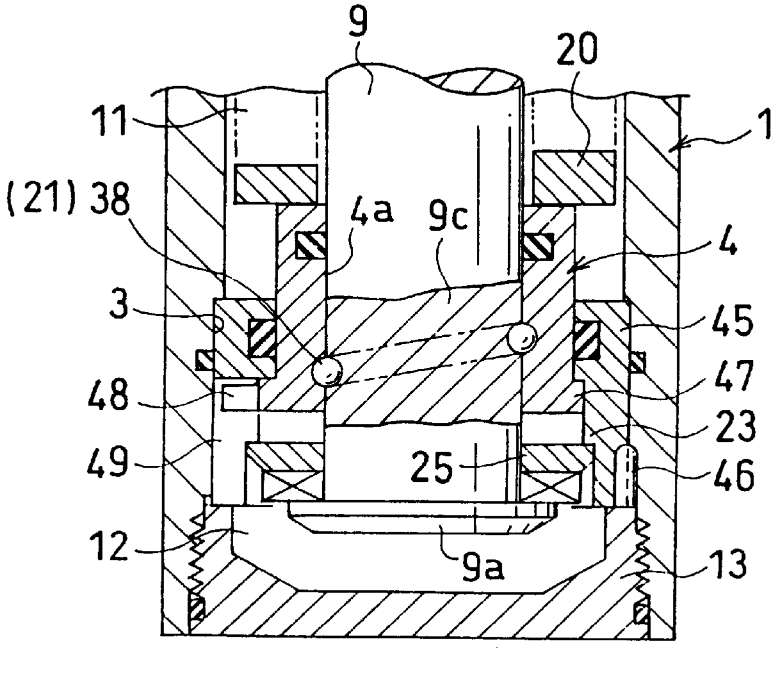
FIG. 9 shows another modification of the clamping apparatus and is a partial view corresponding to FIG. 1.

FIGS. 8 and 9 each show a modification of the clamping apparatus and are partial views corresponding to FIG. 1. In these modifications, the members which function like those mentioned in the first embodiment are in principle designated by the same numerals.

In the modification shown in FIG. 8, an actuation rod 42 is attached to the input portion 9*a* for clamping of the clamp rod 9 by a pin 41. The actuation rod 42 projects downward of the screw cap 13. It is possible to identify whether the clamping apparatus is in the clamping condition or in the retreated condition through detecting a height of a projected screw portion 43 of the actuation rod 42 by a limit switch or the like detectors.

The modification of FIG. 9 is created by modifying the clamping apparatus of FIG. I for a high-pressure use (where pressurized oil having a relatively high pressure of about 140 to 250 $kgf/cm^2$ 'about 14 to 25 MPa' is supplied). A sleeve 45 for adapter is oiltightly fixed to the guide bore 3 of the housing 1. Numeral 46 designates a detent pin. The annular piston 4 is unrotatably inserted into the sleeve 45. More specifically, a projection 48 of a lower flange 47 of the piston 4 is fitted into a vertical groove 49 of the sleeve 45. The stopper 23 provided in the sleeve 45 receives the transmission plate 25.

Figure 10:
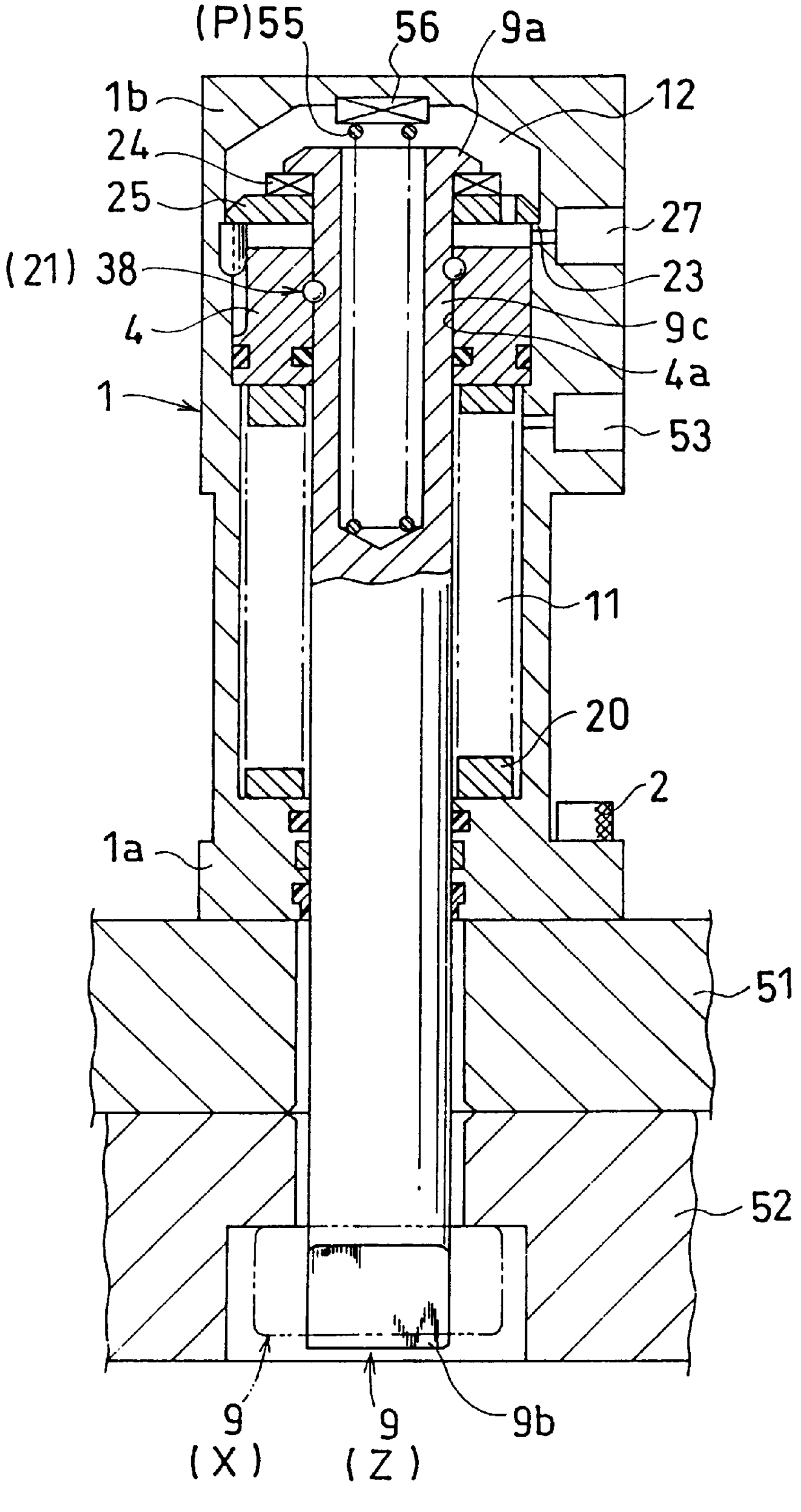
FIG. 10 shows a second embodiment of the present invention and corresponds to FIG. 1.

FIG. 10 shows a second embodiment of the clamping apparatus and corresponds to FIG. 1. Also in this second embodiment, the members which function like those mentioned in the first embodiment are in principle designated by the same numerals.

The clamping apparatus shown in FIG. 10 fixes an upper die 52 to an under surface of a slide 51 of a press machine. It is arranged in a posture vertically opposite to the first embodiment and has a structure of double-acting type.

More specifically, while the supply and the discharge port 27 is communicated with the second chamber 12 formed above the annular piston 4, another supply and discharge port 53 is also communicated with the first chamber 11 formed below the piston 4.

In an illustrated condition, the pressurized oil is discharged from the first chamber 11 and supplied to the second chamber 12. The clamp rod 9 is switched over to the retreated position (Z).

At the time of clamping, the pressurized oil is discharged from the second chamber 12 and supplied to the first chamber 11. Then the clamp rod 9 is operated similarly as shown in FIGS. 2(A), 2(B) and 2(C) and switched over to the clamping position (X) indicated by an alternate dash-and-two dots chain line. In this case, the clamp rod 9 can be strongly driven by the urging force of the clamping spring 20 in addition to the oil pressure of the first chamber 11. Even if the oil pressure of the first chamber 11 disappears for some reason, the urging force of the clamping spring 20 can keep the clamping condition.

The pushing means (P) is composed of a pushing spring 55 attached within an upper portion of the clamp rod 9 and the pressurized fluid creating a back pressure within the second chamber 12 when the clamp rod 9 is rotated for clamping. Numeral 56 indicates a thrust bearing.

Please note the pushing means (P) may employ either of the pushing spring 55 and the pressurized fluid within the second chamber 12.

The second embodiment presents the following advantage.

There is provided the pushing spring 55 for urging the clamp rod 9 toward the first end wall la. Accordingly, even if the back pressure produced within the second chamber 12 is small for some reason, the urging force of the pushing spring 55 can push the input portion 9*a* for clamping to the stopper 23 without failure and therefore rotate the clamp rod 9 assuredly.

Each of the above-mentioned embodiments can be modified as follows.

The fluid to be supplied to the first chamber 11 or the second chamber 12 may be other kinds of liquid or a gas such as air instead of the pressurized oil.

The converting mechanism 21 may have a structure of either a combination of a spiral inclined groove and a cam fitted into the groove or a screw-thread fitting instead of the rolling-ball type.

What is claimed is:

1. A rotary clamping apparatus comprising:

a housing (1) having a first end wall (1*a*) and a second end wall (1*b*);

an annular piston (4) provided with a through-hole (4*a*) and inserted into the housing (1) axially movably but unrotatably;

a first chamber (11) formed between the first end wall (1*a*) and the piston (4);

a second chamber (12) formed between the second end wall (1*b*) and the piston (4), a pressurized fluid being supplied to and discharged from the second chamber (12);

a clamp rod (9) having an input portion (9*a*) for clamping and an input portion (9*c*) for rotation and hermetically inserted into the through-hole (4*a*) of the piston (4), the input portion (9*a*) for clamping being projected into the second chamber (12);

a clamping spring (20) mounted in the first chamber (11) for urging the piston (4) toward the second end wall (1*b*);

a converting mechanism (21) provided between the input portion (9*c*) for rotation and the piston (4) so as to convert an axial movement of the piston (4) to a rotary movement of the clamp rod (9);

a stopper (23) for preventing the input portion (9*a*) for clamping from moving toward the first end wall (1*a*); and a pushing means (P) for pushing the input portion (9*a*) for clamping to the stopper (23).

2. The rotary clamping apparatus as set forth in claim 1, wherein an urging force of the clamping spring (20) produces a predetermined back pressure in the pressurized fluid within the second chamber (12), the back pressure acting on the clamp rod (9) such that the pressurize fluid comprises at least a portion of the pushing means (P).

3. The rotary clamping apparatus as set forth in claim 1, wherein there is provided a pushing spring (55) for urging the clamp rod (9) toward the first end wall (1*a*), the pushing spring (55) applying an urging force on the clamp rod (9) such that the pushing spring (55) comprises at least a portion of the pushing means (P).

4. The rotary clamping apparatus as set forth in claim 1, wherein an annular transmission plate (25) is interposed between the input portion (9*a*) for clamping and the stopper (23), the input portion (9*a*) for clamping being rotatably inserted into the transmission plate (25).

5. The rotary clamping apparatus as set forth in claim 4, wherein the annular transmission plate (25) is axially movably supported on a peripheral wall of the second chamber (12).

6. The rotary clamping apparatus as set forth in claim 4, wherein a thrust bearing (24) is interposed between the transmission plate (25) and the input portion (9*a*) for clamping.

* * * * *